(12) United States Patent
Chen (10) Patent No.: US 10,880,227 B2
(45) Date of Patent: Dec. 29, 2020

(54) APPARATUS, HYBRID APPARATUS, AND METHOD FOR NETWORK RESOURCE ACCESS

(71) Applicant: Alibaba Group Holding Limited, Grand Cayman (KY)

(72) Inventor: Binghui Chen, Guangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 140 days.

(21) Appl. No.: 16/085,147

(22) PCT Filed: Apr. 24, 2017

(86) PCT No.: PCT/CN2017/081730
§ 371 (c)(1),
(2) Date: Sep. 14, 2018

(87) PCT Pub. No.: WO2017/206626
PCT Pub. Date: Dec. 7, 2017

(65) Prior Publication Data
US 2019/0058667 A1    Feb. 21, 2019

(30) Foreign Application Priority Data

Jun. 1, 2016    (CN) .......................... 2016 1 0383985

(51) Int. Cl.
*G06F 15/173* (2006.01)
*H04L 12/911* (2013.01)
(Continued)

(52) U.S. Cl.
CPC .............. *H04L 47/70* (2013.01); *G06F 9/451* (2018.02); *G06F 9/547* (2013.01); *G06F 16/957* (2019.01); *H04L 67/02* (2013.01)

(58) Field of Classification Search
CPC ......... H04L 47/70; H04L 67/02; G06F 9/451; G06F 9/547; G06F 16/957
(Continued)

(56) References Cited

U.S. PATENT DOCUMENTS

2014/0136954 A1* 5/2014 Ligman .................. G06F 17/00
715/234
2019/0073230 A1* 3/2019 Ruder .................... G06F 9/3017

FOREIGN PATENT DOCUMENTS

CN    103179166 A    6/2013
CN    105159999 A    12/2015
(Continued)

OTHER PUBLICATIONS

The World Intellectual Property Organization (WIPO) International Search Report for PCT/CN2017/081730 dated Aug. 2, 2017 4 Pages.

*Primary Examiner* — Wing F Chan
*Assistant Examiner* — Joseph R Maniwang
(74) *Attorney, Agent, or Firm* — Alston & Bird LLP (57) ABSTRACT

A network resource access apparatus, a hybrid apparatus, and a method are provided. The network resource access apparatus includes a native application programming interface (API) unit that provides a native API having a feature of accessing the operating system; a script parsing unit that parses the obtained service function script that is written in a specified script language to obtain the content of the service function described by the service function script; a page rendering unit that, according to the content of the service function, calls the native API provided by the native API unit to render and generate an interactive page constituted by a plurality of native UI components. The time and the labor costs for developing service functions may be reduced.

17 Claims, 3 Drawing Sheets

(51) Int. Cl.
  *G06F 16/957*  (2019.01)
  *G06F 9/451*  (2018.01)
  *G06F 9/54*  (2006.01)
  *H04L 29/08*  (2006.01)
(58) Field of Classification Search
  USPC .......................................................... 709/226
  See application file for complete search history.

(56)  References Cited

FOREIGN PATENT DOCUMENTS

CN    105354013 A   2/2016
  CN    105354014 A   2/2016

\* cited by examiner

APPARATUS, HYBRID APPARATUS, AND METHOD FOR NETWORK RESOURCE ACCESS

CROSS-REFERENCE TO RELATED APPLICATIONS

This application is a national phase entry under 35 U.S.C. § 371 of International Application No. PCT/CN2017/081730, filed on Apr. 24, 2017, which claims the priority and benefits of Chinese Patent Application Serial No. CN201610383985.X, filed with the State Intellectual Property Office of P. R. China on Jun. 1, 2016, the entire content of all of which is incorporated herein by reference.

FIELD OF THE INVENTION

The present invention generally relates to the field of Internet technology and, more particularly, relates to an apparatus, a hybrid apparatus, and a method for network resource access.

BACKGROUND

Today, the Internet has become an indispensable part of people's lives. As software product that can display the contents of HTML (Hyper Text Markup Language) files of web servers or file systems and provide interaction between the users and the files, a browser is an important tool for people to access the Internet. The importance of a browsing engine as the kernel of a browser is self-evident. Currently, most of the browsing engines are based on the HTML technology. With the development of the HTML technology in recent years, the results of page display become better and better for HTML-based browsing engines, and the labor and the time costs for development are gradually reduced. However, when the HTML technology is applied to mobile devices (mobile phones, tablets, etc.), and because different mobile devices may not perform at the same level, the overall performance of HTML pages may not be as desired. As a result, browsing-engine developers are turning to use the native development language (such as Java for an Android operating system, or Objective C and Swift for an iOS operating system) for the operating system of mobile devices to implement the browsing engine.

However, the inventors have found that using the native development language to develop the service functions of the browsing engine requires relatively high cost in labor and time, and when there is a problem with the code of a service function developed using the native development language, the browsing engine may have to be upgraded in order to solve the problem. Such a method is very inefficient, and may have a great impact on the users.

Therefore, the inventors believe that it is necessary to make improvements with respect to the above problem that exists in the current technology.

BRIEF SUMMARY OF THE INVENTION

An objective of the present invention provides a new technical solution for implementing network resources access.

According to a first aspect of the present invention, a network resource access apparatus is provided. The apparatus includes: a native application programming interface (API) unit, configured to provide a native API having a feature of accessing the operating system, the feature of accessing the operating system at least including a feature of accessing native user interface (UI) components of the operating system; a script parsing unit, configured to parse the obtained service function script that is written in a specified script language to obtain the content of the service function described by the service function script; a page rendering unit, configured to, according to the content of the service function, call the native API provided by the native API unit to render and generate an interactive page constituted by a plurality of native UI components.

In one embodiment, the network resource access apparatus further includes:
a script acquisition unit, configured to, according to a received network resource access request, acquire a corresponding service function script.

In another embodiment, the network resource access request includes a uniform resource locator (URL), and the script acquisition unit includes:
a device configured to acquire the location of the requested network resource according to the received URL; and
a device configured to acquire the corresponding service function script from the location of the network resource.

In another embodiment, the network resource access apparatus further includes:
an operation response unit, configured to in response to an operation of a user on the interactive page, write parameters corresponding to the content of the operation to a service function script corresponding to the interactive page.

Optionally, the feature of accessing the operating system also includes a feature of accessing a sensor component of the operating system and/or a feature of accessing a file.

Optionally, the specified operating system is an Android operating system and the native development language of the operating system is Java, or the specified operating system is an iOS operating system and the native development language of the operating system is Objective C/C++ or Swift.

Also, optionally, the specified script language is JavaScript.

According to a second aspect of the present invention, a network resource access method is provided. The method includes the following steps: parsing an obtained service function script, and acquiring the content of the service function described by the service function script; according to the content of the service function, calling a native API that has a feature of accessing the operating system to render and generate an interactive page that corresponds to the service function script and is constituted by a plurality of native UI components, the feature of accessing the operating system at least including a feature of accessing native UI components of the operating system.

In one embodiment, prior to parsing the obtained service function script, and acquiring the content of the service function described by the service function script, the network resource access method further includes:
according to a received network resource access request, acquiring a corresponding service function script that is written in a specified script language.

In one embodiment, the network resource access request includes a URL, and acquiring the corresponding service function script that is written in the specified script language according to the received network resource access request includes:

according to the received URL, acquiring a location of the access-requested network resource;

acquiring the corresponding service function script from the location of the network resource.

In another embodiment, the network resource access method further includes: in response to an operation of a user on the interactive page, writing parameters corresponding to the content of the operation to a service function script corresponding to the interactive page; parsing the service function script that writes the parameters, and according to the content of the service function obtained through parsing, calling the native API having a feature of accessing the operating system to render and generate an interactive page in response to the user operation.

Optionally, the feature of accessing the operating system also includes a feature of accessing a sensor component of the operating system and/or a feature of accessing a file.

Optionally, the specified operating system is an Android operating system and the native development language of the operating system is Java, or the specified operating system is an iOS operating system and the native development language of the operating system is Objective C/C++ or Swift.

Also, optionally, the specified script language is JavaScript.

According to a third aspect of the present invention, a hybrid apparatus is provided for network resource access. The hybrid apparatus includes:
  a network resource access apparatus according to any one of the first aspect of the present invention, comprising: a native API unit, a script parsing unit, and a page rendering unit, and configured to call a native API according to the service function script that is written in a specified script language to generate a corresponding interactive page constituted by a plurality of native UI components;
  an HTML browsing engine, configured to, according to the received webpage document data, generate a corresponding webpage; and including a JavaScript engine for parsing the webpage document data and a typesetting engine for generating a webpage corresponding to the webpage document data;
  a device-selection unit, configured to, according to a network resource access request, select a corresponding target device from the network resource access apparatus and the HTML browsing engine;
  a device framework unit, configured to, according to the network resource access request, acquire a corresponding target file, and call the target device to generate a target webpage corresponding to the target file and display the target webpage in a current window, where:
  when the target device is the network resource access apparatus, the target file is the service function script corresponding to the network resource access request, and the target webpage is the interactive page corresponding to the service function script,
  when the target device is the HTML browsing engine, the target file is the webpage document data corresponding to the network resource access request, and the target webpage is the webpage corresponding to the webpage document data.

In one embodiment, the network resource access request includes a URL, and the method for the device framework unit to acquire the corresponding target file according to the received network resource access request includes:
  according to the received URL, acquiring a location of the access-requested network resource;
  acquiring the corresponding target file from the location of the network resource.

In another embodiment, the network resource access request includes a type identifier for indicating the engine type of the target device.

Optionally, the network resource access request includes a URL, the URL carries a type identifier used to indicate the engine type of the network resource access apparatus or the HTML browser, and the method for the device-selection unit to select the corresponding target device from the network resource access apparatus and the HTML browsing engine according to the network resource access request includes: identifying the type identifier carried in the URL; according to the identification result, selecting one from the network resource access apparatus and the HTML browsing engine as the target device.

In another embodiment, when the specified script language is JavaScript, the script of the network resource access apparatus multiplexes the JS engine of the HTML browsing engine.

According to a fourth aspect of the present invention, a network resource access method is provided. The method includes the following steps:
  According to a network resource access request, selecting a corresponding target device from a network resource access apparatus and an HTML browsing engine, where:
  the network resource access apparatus is a network resource access apparatus according to any one of the first aspect of the present invention, comprising: a native API unit, a script parsing unit, and a page rendering unit, and configured to call a native function according to the service function script that is written in a specified script language to generate a corresponding interactive page constituted by a plurality of native UI components;
  the HTML browsing engine, configured to, according to the received webpage document data, generate a corresponding webpage; and including a JavaScript engine for parsing the webpage document data and a typesetting engine for generating a webpage corresponding to the webpage document data;
  according to the received network resource access request, acquiring a corresponding target file, and calling the target device to generate a target webpage corresponding to the target file and display the target webpage in a current window, where:
  when the target file is the service function script corresponding to the network resource access request, the target device is the network resource access apparatus, and the target webpage is the interactive page corresponding to the service function script,
  when the target file is the webpage document data corresponding to the network resource access request, the target device is the HTML browsing engine, and the target webpage is the webpage corresponding to the webpage document data.

In one embodiment, the network resource access request includes a URL, and the step for acquiring the target file of the target device according to the received network resource access request includes:
  according to the received URL, acquiring a location of the access-requested network resource;
  acquiring the corresponding target file from the location of the network resource.

In another embodiment, the network resource access request includes a type identifier for indicating the engine type of the target device.

Optionally, when the specified script language is JavaScript, the script parsing unit of the network resource access apparatus parses the service function script by calling the JavaScript engine of the HTML browsing engine.

Optionally, the network resource access request includes a URL, and the URL carries a type identifier used to indicate the engine type of the network resource access apparatus or the HTML browser. The method for the device-selection unit to select the corresponding target device from the network resource access apparatus and the HTML browsing engine according to the network resource access request includes: identifying the type identifier carried in the URL; according to the identification result, selecting one from the network resource access apparatus and the HTML browsing engine as the target device.

According to a fifth aspect of the present invention, a programmable device is provided. The programmable device includes a memory and a processor. The memory is configured to store instructions that are used to control the processor to execute operations such that a network resource access method according to any one of the second aspect of the present invention is performed.

According to a sixth aspect of the present invention, a programmable device is provided. The programmable device includes a memory and a processor. The memory is configured to store instructions, and the instructions are used to control the processor to execute operations such that a network resource access method according to any one of the fourth aspect of the present invention is performed.

The inventors of the present invention found that in the current technology, a network resource access apparatus and method, that can reduce the labor and the time costs for service function development, provide users smooth operation experience, and also be upgraded efficiently, have not been proposed. In addition, a hybrid apparatus and a network resource access method based on the hybrid apparatus, that are able to integrate the network resource access apparatus provided by the present invention together with the HTML engines according to the current technology to provide continuous and desired user experience, have not be offered. Therefore, the technical task to be achieved or the technical problem to be solved according to the present invention is never thought or expected by those in the art, and thus the present invention provides a new technical solution.

Further features and the advantages of the present invention will become apparent from the following detailed description of the exemplary embodiments of the present invention.

BRIEF DESCRIPTION OF THE DRAWINGS

The accompanying drawings, which are incorporated as part in the specification, illustrate some embodiments of the present invention, and together with the description thereof, the drawings are used to explain the principles of the invention.

DETAILED DESCRIPTION

Various exemplary embodiments of the present invention will now be described in detail with reference to the drawings. It should be noted that, unless otherwise specified, the relative arrangement of the components and steps, the numerical expressions and the numerical values set forth in the embodiments are not intended to limit the scope of the invention.

The following description of at least one exemplary embodiment is merely illustrative, and by no means, is intended to limit the invention and its application or use.

Techniques, methods, and apparatuses known to those of ordinary skill in the relevant art may not be discussed in detail, but where appropriate, the techniques, methods, and apparatuses should be considered as part of the specification.

In all of the examples shown and discussed herein, any specific value should be construed as illustrative only and not as a limitation. Therefore, other examples of the exemplary embodiments may have different values.

It should be noted that similar reference numbers and letters refer to similar items in the following figures, and therefore, once an item is defined in a drawing, further discussion in the subsequent figures may not be required.

<Hardware Configuration>

Figure 1:
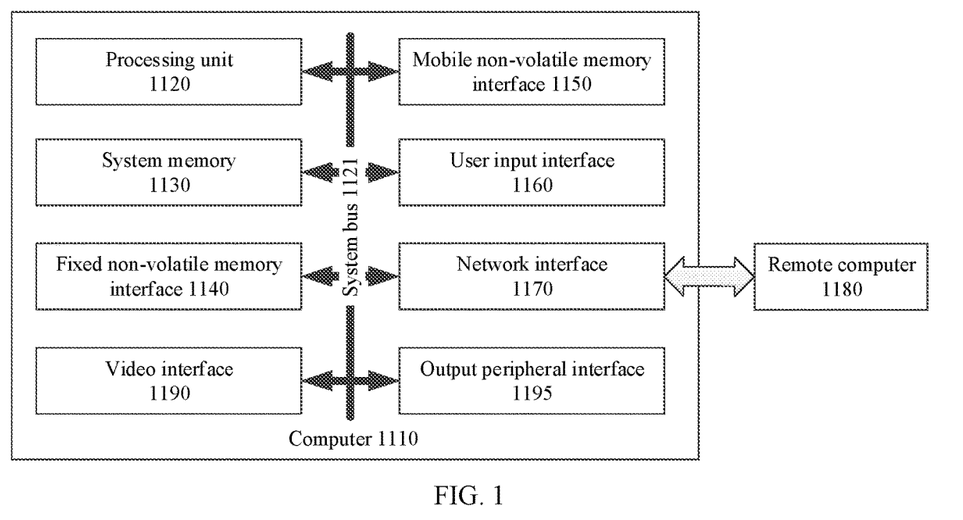
FIG. 1 illustrates a block diagram of the hardware configuration of a computer system according to an embodiment of the present invention.

FIG. 1 illustrates a block diagram of the hardware configuration of a computer system 1000 that can be used to implement an embodiment of the present invention.

As shown in FIG. 1, the computer system 1000 may include a computer 1110 and a remote computer 1180. The computer 1110 may include a processing unit 1120, a system memory 1130, a fixed non-volatile memory interface 1140, a mobile non-volatile memory interface 1150, a user input interface 1160, a network interface 1170, a video interface 1190, and an output peripheral interface 1195 that are connected through a system bus 1121.

The system memory 1130 may include a read only memory (ROM) and a random access memory (RAM). A basic input output system (BIOS) may reside in the ROM. The operating system, application programs, other program modules, and certain program data may reside in the RAM. The processing unit 1120 may be configured to execute software function modules or computer program data stored in the RAM.

A fixed non-volatile memory such as a hard disk may be connected to the fixed non-volatile memory interface 1140. The fixed non-volatile memory may store, for example, an operating system, application programs, other program modules, and certain program data.

A mobile non-volatile memory such as a floppy disk drive and a CD-ROM drive may be connected to the mobile non-volatile memory interface 1150. For example, a floppy disk can be inserted into a floppy disk drive, and a compact disc (CD) can be inserted into the CD-ROM drive.

Input devices such as a mouse and keyboard may be connected to the user input interface 1160.

The computer 1110 may be coupled to the remote computer 1180 via the network interface 1170. For example, the network interface 1170 may be connected to a remote computer via a local area network. Alternatively, the network interface 1170 may be connected to a modem (modulator-demodulator), and the modem may be connected to the remote computer 1180 via a wide area network (WAN).

The remote computer 1180 may include a memory, such as a hard disk, that can store remote application programs.

The video interface 1190 may be connected to, for example, a monitor.

The output peripheral interface 1195 may be connected to, for example, a printer and a speaker.

The computer system shown in FIG. 1 is merely illustrative, and by no means, is intended to limit the invention and its application or use.

First Embodiment

Figure 2:
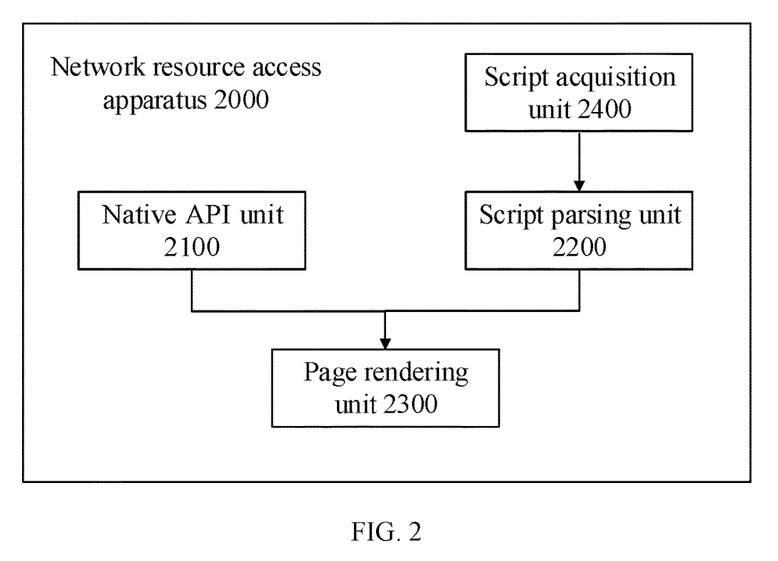
FIG. 2 illustrates a schematic block diagram of a network resource access apparatus according to an embodiment of the present invention.

FIG. 2 illustrates a functional block diagram of a network resource access apparatus 2000 according to a first embodiment of the present invention. The network resource access apparatus 2000 may include at least one software function module that can be stored in the system memory 1130 in the form of software or firmware, or can be embedded in an operating system of the computer system 1000. For example, FIG. 2 shows a native application programming interface (API) unit 2100, a script parsing unit 2200, and a page rendering unit 2300. Optionally, a script acquisition unit 2400 may also be included.

As an implementation method, the network resource access apparatus 2000 may be implemented based on a specified operating system. The operating system (OS) may be a computer program that manages and controls computer hardware and software resources. It is the most basic system software that runs directly on the "bare machine". Any other software must be supported by the operating system, and the network resource access apparatus 2000 provided in this embodiment is also no exception. The operating system specified in this embodiment may be a Windows operating system, an Android operating system, or an iOS operating system, etc. As long as the hardware and the software of the computer that access the network resource access apparatus 2000 of the embodiment can be managed and controlled, any operating system that supports the operation of the network resource access apparatus in this embodiment may be the specified operating system described in this embodiment, and is not enumerated here. The functional units shown in FIG. 2 will be explained in detail as following.

The native API unit 2100 may be configured to provide a native API having a feature of accessing the operating system. The feature of accessing the operating system at least includes a feature of accessing native UI components of the operating system.

An API (application programming interface) is a collection of predefined functions or predefined functions designed to provide application programs for third-party developers to implement service functions based on certain software or hardware, such that the third-party developers, without having to access the source code of the software or understand the details of the internal working mechanism of the software or hardware, can still access a set of routines based on the software or hardware by calling the API.

In this embodiment, the native API may refer to an API implemented using a native development language of the operating system. Implementing the native API using the native development language of the operating system may allow that when the native API is called to implement various service functions, the hardware functions related to the operating system may be directly accessed to improve the operating efficiency, and provide smooth operation experience. In one example, the specified operating system is an Android operating system and the native development language of the operating system is Java. Alternatively, the specified operating system is an iOS operating system, and the native development language of the operating system is Objective C/C++ or Swift.

In this embodiment, the native API is an API having a feature of accessing the operating system, in other words, it is a collection of predefined functions that have a feature of accessing the operating system. The feature of accessing the operating system at least includes a feature of accessing native UI components of the operating system. For example, the native API may include a predefined function which can be used to implement string display, and may have a feature of accessing the native UI components of the operating system involved in implementing string display. When the specified operating system is an Android operating system, the predefined function may be implemented using the native development language Java, and the predefined function can access the native UI component, TextView, of the Android operating system to render the displayed string. When the specified operating system is an iOS operating system, the predefined function may be implemented using the native development language Objective C, and the predefined function can access the native UI component, UITextView, of the iOS operating system to render the displayed string.

In one example, the feature of accessing the operating system may further include a feature of accessing a sensor component of an operating system and/or a feature of accessing a file.

In one example, the native API may also have a feature of accessing the sensor components of the operating system. For example, the native API may include a predefined function having a feature of accessing a gravity sensor of the operating system. When the specified operating system is an Android operating system, the predefined function may be implemented using the native development language Java, and the predefined function may access the gravity sensor through the system interface of the Android operating system ((SensorManager) getSystemService(SENSOR_SERVICE)).getDefaultSensor(Sensor.TYPE_GRAVITY) and register a sensor listener in the Android operating system, such that a data change of the gravity sensor can be acquired in real time and outputted when the native API is called. When the specified operating system is an iOS operating system, the predefined function may be implemented using the native development language Objective C, and the predefined function may be used to access the native UI component, UIAccelerometer, of the iOS operating system to access the gravity acceleration sensor and register a sensor listener in the iOS operating system, such that a data change of the gravity acceleration sensor can be acquired in real time and outputted when the native API is called.

In another example, the native API may also have a feature of accessing files. For example, the native API may include a predefined function that can be used to write files, and thus have a feature of accessing the files. When the specified operating system is an Android operating system, the predefined function may be implemented using the native development language Java, and the predefined function may be able to write data to a specified file address. When the specified operating system is an iOS operating system, the predefined function may be implemented using the native development language Objective C, and the predefined function may be able to write data to a specified file address.

The script parsing unit 2200 may be configured to parse the obtained service function script that is written in the specified script language to obtain the content of the service function described by the service function script.

The service function may be a function, such as displaying text, playing video, etc., that is related to a specific application service developed and implemented by a third-party developer based on the network resource access apparatus 2000. The service function is not limited in this embodiment. For the development of a service function, without knowing the working principle of the network resource access apparatus 2000 or accessing the source code of the network resource access apparatus 2000, the third-party developer may use a specified script language to write a script to describe the content of the service function. It is a relatively simple development method for a third party developer, and the labor and the time costs are relatively low. In addition, when a service function is incorrect or an application is upgraded, only the script of the service function needs to be updated, and the network resource access apparatus 2000 may not need to be modified or upgraded, and thus the processing efficiency is high, and the impact on the user is insignificant.

In one example, the specified script language may be JavaScript.

For example, a service function script is {"type": "text", "style": {"fontSize": 100}, "attr": {"value": "Hello World."}}. Through the script parsing unit 2200, the content of the service function described by the service function script can be parsed as: display a string, e.g. Hello World, with a font size of 100.

In another example, the service function script is {"type": "writeFile", "attr":{"data":"data to write", "path":"/file/path/to/write"}}. Through the script parsing unit 2200, the content of the service function described by the service function script can be parsed as: write data "data to write" in the path/file/path/to/write.

In another example, the service function script is {"type": "GravityListener", "listener": function (gravity) {alert(gravity);}}. Through the script parsing unit 2200, the content of the service function described by the service function script can be parsed as: acquire the gravity sensor and register the data change of the gravity sensor.

In another example, the script parsing unit 2200 may be further configured to implement basic functions of the specified script language, such as addition, subtraction, etc., after parsing the service script function.

The page rendering unit 2300 may be configured to, according to the content of the service function, call a native API provided by the native API unit to render and generate an interactive page constituted by a plurality of native UI components.

For example, the content of the service function is: display a string, e.g. Hello World, with a font size of 100. Taking an Android operating system as an example for the specified operating system, the page rendering unit 2300 may call a native API that is implemented by the native development language Java in the native API unit 2200, and render the display of the string, i.e., Hello World, through a predefined function of the native API that has a feature of accessing the native UI component, TextView, of the Android operating system. Taking an iOS operating system as an example for the specified operating system, the page rendering unit 2300 may call a native API that is implemented using the native development language Objective C, and render the display of the string, i.e., Hello World, through a predefined function of the native API that has a feature of accessing the native UI component, UITextView, of the iOS operating system.

In another example, the content of the service function is: writing data "data to write" in the path/file/path/to/write. Taking an Android operating system as an example for the specified operating system, the page rendering unit 2300 may call a native API that is implemented in the native API unit 2200 using the native development language Java, and create a file in the path/file/path/to/write to write the data "data to write" through a predefined function of the native API that can access a specified file address and write data. Taking an iOS operating system as an example for the specified operating system, the page rendering unit 2300 may call a native API that is implemented using the native development language Objective C, and create a file in the path/file/path/to/write to write the data "data to write" through a predefined function of the native API that can access a specified file address and write data.

In another example, the content of the service function is: acquiring a gravity sensor and register a data change of the gravity sensor. Taking an Android operating system as an example for the specified operating system, the page rendering unit 2300 may call a native API that is implemented in the native API unit 2200 using the native development language Java, and acquire the data change of the gravity sensor and output it in real time through a predefined function of the native API that can access the gravity sensor through the system interface of the Android operating system ((SensorManager) getSystemService (SENSOR_SERVICE)).getDefaultSensor(Sensor.TYPE_GRAVITY) and register a sensor listener in the Android operating system. Taking an iOS operating system as an example for the specified operating system, the page rendering unit 2300 may call a native API that is implemented using the native development language Objective C, and acquire the data change of the gravity sensor and output it in real time through a predefined function of the native API that can access the native UIcomponent, UIAccelerometer, of the iOS operating system and register a sensor listener in the iOS operating system.

In this embodiment, the interactive page is constituted by a plurality of native user interface (UI) components. The native UI components may be user interface components that come with the operating system, including, for example, native text components for displaying text, native video/view components for displaying video, native image components for displaying images, etc. Webpage elements (text, picture, audio, animation, video, etc.) of the interactive page may be represented by the native UI components of the system. For example, when a webpage element is text, it may be represented by a native text component in the interactive page. In another example, when the webpage element is a picture, it may be represented by a native picture component in the interactive page. For an interactive page constituted by multiple native UI components, the operation effect is smooth, the overall performance of the page is desired, and the user experience can be obtained.

In another example, the network resource access apparatus 2000 may also include an operation response unit. The operation response unit may be configured to, in response to an operation of a user on the interactive page, write parameters corresponding to the content of the operation to a service function script that corresponds to the interactive page. After the parameters corresponding to the content of the operation are written to the service function script that corresponds to the interactive page, the service function script can be re-parsed by the script parsing unit 2200 of the network resource access apparatus 2000 to obtain the content of the service function. Further, the page rendering unit 2300 may call the native API provided by the native API unit 2100 to render and generate the interactive page again in response to the user operation. For example, when the user inputs, e.g. "Hello World", in the input box on the interactive page, after "Hello World" is written into the corresponding service function script by the operation response unit described in this example, the script parsing unit 2200 may re-analyze the service function script and obtain the content of the service function as to display the string "Hello World". Then, the native API unit 2100 may be called to render and generate an interactive page on which the string "Hello World" is displayed by the native UI component.

In yet another example, the network resource access apparatus 2000 may further include a script acquisition unit 2400. The script acquisition unit 2400 may be configured to obtain a corresponding service function script according to the received network resource access request. The network resource access request typically contains the uniform resource locator (URL) or location of the network resource to be accessed. For example, the network resource access request may include a URL, and the script acquisition unit 2400 may acquire a location of the requested network resource according to the received URL, and thus obtain the corresponding service function script from the location of the network resource.

The URL may be a compact representation of the location and the access method of a resource available from the Internet, and may be the address of a standard resource on the Internet. Each file (resource) on the Internet may have a unique URL. For example, when a URL is "file://a/b/c.js?weex=", the location to obtain the requested network resource may be local, and the corresponding service function script may be downloaded from a local specific location. In another example, when a URL is "http://a/b/c.js?weex=", the location to obtain the requested network resource may be at an http server, and the corresponding service function script may be downloaded from the http server.

The network resource access apparatus 2000 in this embodiment may have various specific implementation manners. For example, the network resource access apparatus 2000 may be implemented as a function module of a browser to provide a browser-like kernel or a function of a browsing engine, and thus implement the access to network resources. In another example, the network resource access apparatus 2000 may be implemented as a functional module of an application (such as an Internet information interaction platform such as WeChat) to provide the access to network resources, or as an external plugin or module called by an application that can be interacted with to provide the access to network resources. In addition, the network resource access apparatus 2000 in this embodiment may also have multiple product forms. The network resource access apparatus 2000 may be included in a browser or an application, and presented as a complete product in a complete browser or application. The network resource access apparatus 2000 may also be presented as a stand-alone product such as a plug-in or a peripheral package. In this embodiment, the network resource access apparatus 2000 is not limited to any specific implementation manner or product form. As long as an apparatus that implements the function of the network resource access apparatus 2000 provided in this embodiment is used in an application scenario, or an apparatus is directly designed by those skilled in the art with considerations of non-technical factor based on the function of the network resource access apparatus 2000 provided in this embodiment, the apparatus is within the protection scope of the embodiment.

A network resource access method is also provided in this embodiment. The method may be implemented by using the network resource access apparatus 200 provided in this embodiment.

Figure 3:
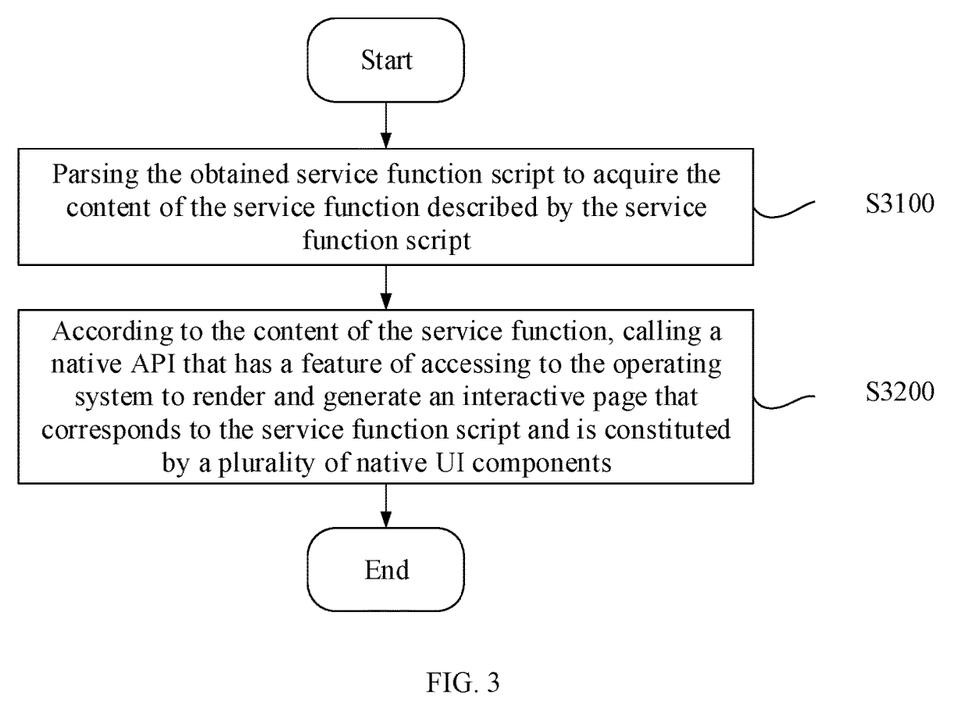
FIG. 3 illustrates a schematic flowchart of a network resource access method according to an embodiment of the present invention.

The method can be implemented on a specified operating system, and as shown in FIG. 3, may include the following steps.

In Step S3100, the obtained service function script may be parsed, and the content of the service function described by the service function script may be acquired.

In one example, the specified script language is JavaScript.

In another example, the network resource access method may further include:
  according to the received network resource access request, acquiring the corresponding service function script written in the specified script language.

In another example, the network resource access request may include a URL, and the step of acquiring a service function script corresponding to the specified script language according to the received network resource access request may include: acquiring, according to the received URL, the location of the access-requested network resource; and acquiring the corresponding service function script from the location of the network resource.

After performing Step S3100, the process may proceed to performing Step S3200. According to the content of the service function, a native API having a feature of accessing the operating system is called, and an interactive page that corresponds to the service function script and is constituted by a plurality of native UI components may be rendered and generated. The feature of accessing the operating system may at least include a feature of accessing native UI components of the operating system. The native API is typically implemented using the native development language of the operating system.

In one example, the feature of accessing the operating system may further include a feature of accessing a sensor component of the operating system and/or a feature of accessing a file.

In another example, the specified operating system is an Android operating system and the native development language of the operating system is Java, or the specified operating system is an iOS operating system and the native development language of the operating system is Objective C/C++ or Swift.

In another example, the network resource access method may further include: in response to an operation of the user on an interactive page, writing parameters corresponding to the content of the operation to the service function script corresponding to the interactive page; parsing the service function script that writes the parameters, and according to the content of the service function obtained through parsing, calling a native API having a feature of accessing the operating system to render and generate an interactive page in response to the operation of the user.

The embodiments of the present invention also provides a programmable device, including a memory and a processor. The memory may be configured to store instructions. The instructions may be used to control the processor to execute operations in order to implement any network resource access method provided by the embodiments of the present invention.

The first embodiment of the present invention has been described above with reference to the accompanying drawings. According to the embodiment, a network resource access apparatus and a method are provided. The service function script that is written in a specified script language may be parsed to obtain the content of the service function to be implemented, and a corresponding API, which is implemented using the native development language and has a feature of accessing the operating system, may be called to render and generate an interactive page constituted by a plurality of native UI components of the operating system. As such, third-party developers can still develop service functions without having to understand the internal implementation of the browsing engine or access the source code of the browsing engine, such that the labor and the time costs may be reduced. In addition, with the native UI component directly accessing native UI components and other system components of the operating system, an interactive page constituted by a plurality of native UI components may be obtained. Thus, the operating efficiency may be high, the users may have smooth operation experience, and user experience may be desired. Moreover, when a service function is incorrect or is upgraded, only the service function script needs to be upgraded, and upgrading the entire browsing engine may be not necessary. As such, the efficiency may be high, and the impact on the user may be insignificant.

Second Embodiment

In some application scenarios, there are multiple network resource access requests. Among them, some network resource access requests may need to access the network resources through the network resource access apparatus 2000 provided in the first embodiment of the present invention, and some network resource requests may need to accesses the network resources through the HTML browsing engines in the existing technology. For example, after a user clicks on a webpage that needs to be accessed through an HTML browsing engine, the user may click on a link in the webpage to access the link through the network resource access apparatus 2000. Moreover, the network resource access apparatus 2000 and the HTML browsing engine may be separately implemented. Thus, the interactive page generated by the network resource access apparatus 2000 and constituted by native UI components of the operating system may be displayed in one window, and the webpage generated by the HTML browsing engine may need to use another window to display, which may cause the user experience to be discontinuous. Moreover, when the HTML webpage and the interactive page that is constituted by native UI components jump from each other, it will jump from one window to another, resulting in undesired user experience.

The second embodiment of the present invention provides a hybrid apparatus for integrating the network resource access apparatus 2000 provided by the first embodiment of the present invention with an HTML browsing engine in the existing technology, such that an interactive page, generated by the network resource access apparatus 2000 and constituted by native UI components, and a webpage generated by the HTML browsing engine can be displayed in a same window. In a webpage that is accessed by a user and generated by the HTML browsing engine, when a network resource needs to be accessed through the network resource access apparatus 2000, after the user clicks to access, without having to open a new window, the corresponding interactive page that is constituted by naive UI components may be displayed in the window which currently displays the HTML webpage. Similarly, in an interactive page that is accessed by a user and constituted by native UI components, when a network resource needs to be accessed through an HTML browsing engine, after the user clicks to access, without having to open a new window, the corresponding HTML webpage may be displayed in the window which currently displays an interactive page constituted by native UI components. In addition, the user may also be able to browse the interactive page, which is constituted by native UI components, together with the HTML webpage in a same window through forward and backward operations, providing the user with continuous and desired user experience.

Figure 4:
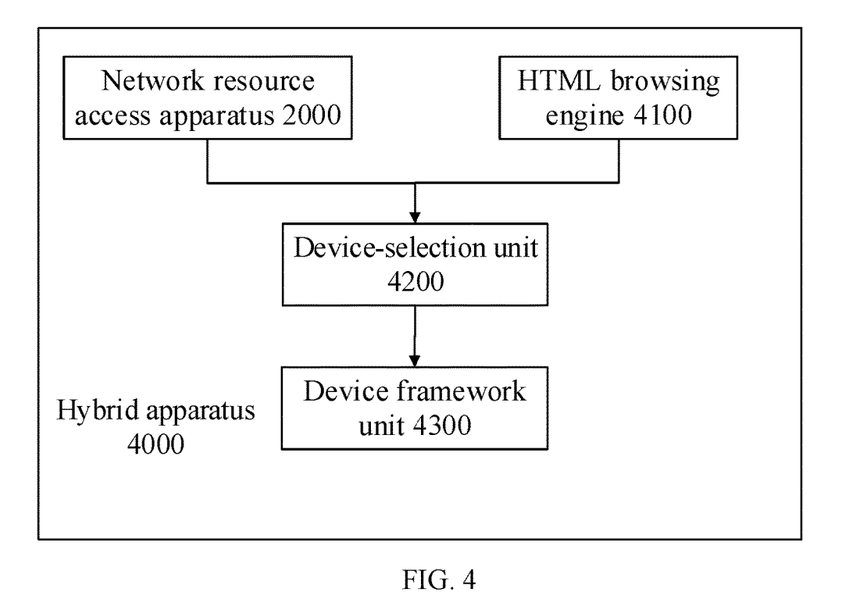
FIG. 4 illustrates a schematic block diagram of a hybrid apparatus according to an embodiment of the present invention.

Based on this, FIG. 4 illustrates a schematic block diagram of a hybrid apparatus 4000 provided by the second embodiment of the present invention. The apparatus may be implemented based on a specified operating system. For example, a network resource access apparatus 2000 provided by the first embodiment of the present invention, an HTML browsing engine 4100, a device-selection unit 4200, and a device framework unit 4300 may be included. The operating system (OS) is a computer program that manages and controls computer hardware and software resources. It is the most basic system software that runs directly on the "bare machine". Any other software must be supported by the operating system, and the browsing engine is also no exception. The operating system specified in this embodiment may be a Windows operating system, an Android operating system, or an iOS operating system, etc. As long as the hardware and the software of the computer that access the network resource access apparatus 2000 of the embodiment can be managed and controlled, any operating system that supports the operation of the hybrid apparatus 4000 in this embodiment may be the specified operating system described in this embodiment, and is not enumerated here.

The network resource access apparatus 2000 may include a native API unit 2100, a script parsing unit 2200, and a page rendering unit 2300, and may be configured to call a native API according to the received service function script that is written in a specified script language to generate a corresponding interactive page constituted by a plurality of native UI components. The details may be referred to the description in the first embodiment of the present invention, and are not repeated herein again.

The HTML browsing engine 4100 may be configured to generate a corresponding webpage according to the received webpage document data, and may include a JavaScript engine (referred to as a JS engine) for parsing the webpage document data using JavaScript and a typesetting engine for generating a webpage corresponding to the webpage document data.

Preferably, the HTML browsing engine may be Chromium or Webkit.

Chromium is an HTML browsing engine developed by Google. The design idea is based on the concepts of simplicity, high speed, stability, and security. The architecture adopts the WebKit typesetting engine developed by Apple, part of Safari's source code, and results of Firefox. In addition, the V8 engine (JS engine) developed by Google is used to improve the efficiency for interpreting JavaScript, and through the design of "sandbox", "blacklist", "no trace browsing", and other functions, a stable and secure web browsing environment is achieved.

WebKit is an open source HTML browsing engine developed by Apple. Coming from KDE's KHTML and KJS, the WebCore layout engine and the JSCore engine (JS engine) included in WebKit have clear source structures and demonstrate extremely fast rendering speeds. The advantages include high efficiency and stability, excellent compatibility, clear source code structure and easy maintenance.

The device selection unit 4200 may be configured to select a corresponding target device from the network resource access apparatus 2000 and the HTML browsing engine 4100 according to the received network resource access request.

In other words, the device selection unit 4200 may be configured to select the network resource access apparatus 2000 or the HTML browsing engine 4100 as a target device to access the requested access resource in response to each network resource access request. As such, the network resource access apparatus 2000 and the HTML browsing engine 4100 may be adaptively selected according to the network resource access request.

In one example, the device selection unit 4200 may parse the related information of the network resource included in the network resource access request, and send an Http request to a network server to inquire the target device for the access-requested network resource. In another example, the network resource access request may include a type identifier for indicating the target device. For example, the network resource access request may include a URL, and the URL may include a type identifier for indicating the target device. Specifically, a type identifier of the engine can be added to the suffix of the URL. For example, when the target device is the network resource access apparatus 2000, the type identifier of the engine may be "nu", and when the target device is the HTML browsing engine 4100, the type identifier of the engine may be "html". The device selection unit 4200 may select a corresponding target device according to the type identifier.

The device framework unit 4300 may be configured to obtain a corresponding target file according to the received network resource access request, and call the target device to generate a target webpage corresponding to the target file and display the target webpage in the current window. When the target device is the network resource access apparatus 2000, the target file may be the service function script that corresponds to the network resource access request, and the target webpage may be the interactive page that corresponds to the service function script; when the target device is the HTML browsing engine 4100, the target file may be the webpage document data that corresponds to the network resource access request, and the target webpage may be the webpage that corresponds to the webpage document data.

In one example, the network resource access request may include a uniform resource locator (URL), and the device framework unit 4300 may acquire a location of the access-requested network resource according to the received URL, and then acquire the corresponding target file from the location of the network resource.

The URL may be a compact representation for the location and the access method of a resource that is available on the Internet, and may be the address of a standard resource on the Internet. Each file (resource) on the Internet may have a unique URL.

For example, when a URL is "file://a/b/c.js?weex=", the location to obtain the requested network resource may be local, and the corresponding service function script may be downloaded from a local specific location. In one example, the URL may also carry a type identifier used to indicate the type of the target device. For example, "nu" may be the type identifier of the network resource access apparatus 2000, and "html" may be the type identifier of the HTML browsing engine 4100. For example, when the URL is ""file://a/b/c.js?weex=nu", the target file downloaded from the local specific location may be a service function script, and when the URL is "file://a/b/c.js?weex=html", the target file downloaded from the local specific location may be webpage document data. In another example, when the URL is "http://a/b/c.js?weex=", it indicates that the requested network resource may be located at an http server, and the corresponding target file may need to be downloaded from the http server. In one example, the URL may also carry a type identifier used to indicate the target device. For example, "nu" is the type identifier of the network resource access apparatus 2000, and "html" is the type identifier of the HTML browsing engine 4100. For example, when the URL is "http://a/b/c.js?weex=nu", the target file downloaded from the http server may be a service function script, and when the URL is "http://a/b/c.js?weex=html", the target file downloaded from the http server may be webpage document data.

Through the device framework unit 4300, the corresponding target file can be obtained in response to each network resource access request, and the target device selected by the device selection unit 4200 can be called to generate a corresponding target webpage and display the target webpage in the current window. As such, the interactive page that is constituted by native UI components and generated by the network resource access apparatus 2000, and the webpage that is generated by the HTML browsing engine 4100 can be displayed in a same window. When a user interacts with a network resource that needs to be accessed through the network resource access apparatus 2000 and also with a network resource that needs to be accessed through the HTML browsing engine 4100, the interactive page constituted by native UI components may be browsed in a same window as the HTML webpage through refreshing or other similar operations (such as clicking the forward or backward arrow provided by the interface). Browsing the interactive page, that is constituted by native UI components, together with the HTML webpage in a same window provides the user desired user experience.

In another example, when the specified script language in the hybrid apparatus 4000 is JavaScript, the script parsing unit 2200 of the network resource access apparatus 2000 may be able to multiplex the JS engine of the HTML browsing engine 4100. The script parsing unit 2200 of the network resource access apparatus 2000 may be used for parsing service function scripts that are written in a specified scripting language. The JS engine of the HTML browsing engine may be used to parse the webpage document data by JavaScript. When the specified script language is JavaScript, the script parsing unit 2200 of the network resource access apparatus 2000 may call the JS engine of the HTML browsing engine 4100 to parse the service function script. As such, the structural complexity of the hybrid apparatus 4000 may be reduced, and the operating efficiency may be improved.

The hybrid apparatus 4000 in this embodiment may have various specific implementation manners. For example, the hybrid apparatus 4000 may be implemented as a function module of a browser to provide a browser-like kernel or a function of a browsing engine, and thus implement the access to network resources. In another example, the hybrid apparatus 4000 may be implemented as a functional module of an application program (such as an Internet information interaction platform such as WeChat) to provide the access to network resources, or as an external plugin or module called by an application program, that can be interacted with, to provide the access to network resources. In addition, the hybrid apparatus 4000 in this embodiment may also have multiple product forms. The hybrid apparatus 4000 may be included in a browser or an application, and presented as a complete product in a complete browser or application. The hybrid apparatus 4000 may also be presented as a stand-alone product such as a plug-in or a peripheral package. In this embodiment, the hybrid apparatus 4000 is not limited to any specific implementation manner or product form. As long as an apparatus implementing the function of the hybrid apparatus 4000 provided in this embodiment is adopted in an application scenario, or an apparatus is directly designed by those skilled in the art with considerations of non-technical factor based on the function of the hybrid apparatus 4000 provided in this embodiment, the apparatus is within the protection scope of the embodiment.

Figure 5:
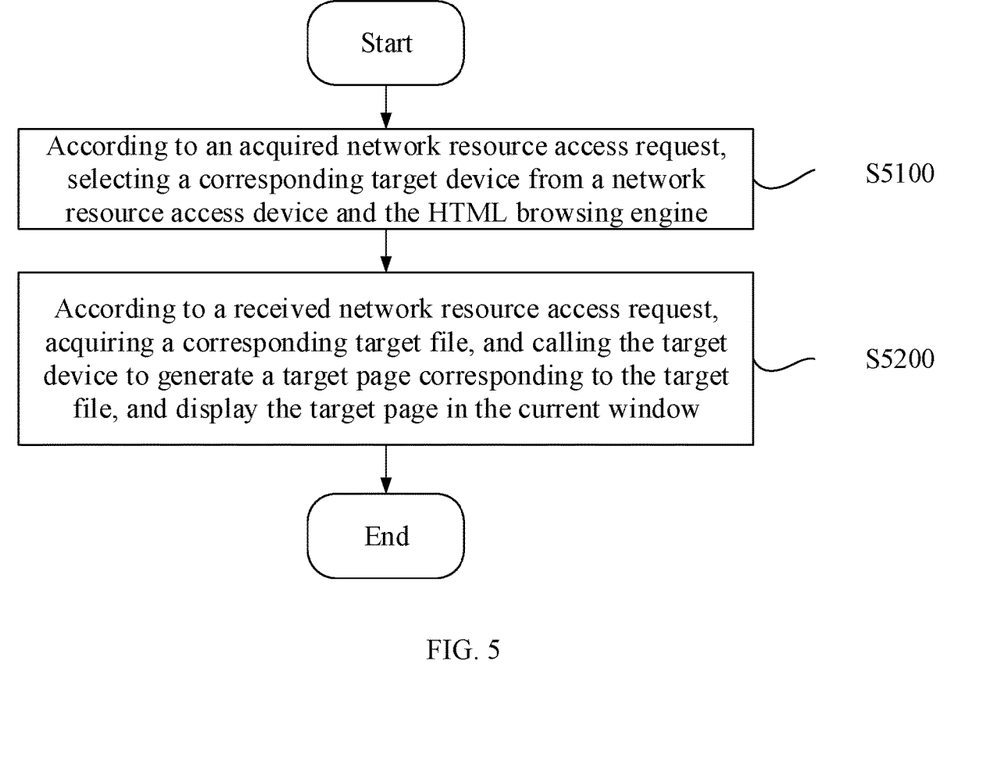
FIG. 5 illustrates a schematic flowchart of another network resource access method according to an embodiment of the present invention.

In the embodiment, a network resource access method, shown in FIG. 5, is also provided. The method may be implemented based on the hybrid apparatus 4000 provided in this embodiment, and specifically, the method may include the following steps:

In Step S5100, according to an acquired network resource access request, a corresponding target device may be selected from a network resource access apparatus 2000 and an HTML browsing engine 4100.

The network resource access apparatus 2000, as provided in the first embodiment of the present invention, may be configured to, according to a received service function script that is written in a specified script language, call a native API to generate a corresponding interactive page that is constituted by a plurality of native UI components of a specified operating system. The HTML browsing engine 4100 may be configured to generate a corresponding webpage according to the received webpage document data, and may include a JS engine for parsing the webpage document data and a typesetting engine for generating a webpage corresponding to the webpage document data.

Optionally, the HTML browsing engine may be Chromium or Webkit.

In one embodiment, when the specified script language is JavaScript, the script parsing unit 2200 of the network resource access apparatus 2000 may multiplex the JS engine of the HTML browsing engine 4100.

After performing Step S5100, the process proceeds to Step S5200. A corresponding target file may be acquired according to the received network resource access request, and the target device may be called to generate a target page corresponding to the target file, and display the target page in the current window.

When the target file is a service function script corresponding to the network resource access request, the target device may be the network resource access apparatus 2000, and the target page may be an interactive page that corresponds to the service function script. When the target file is webpage document data corresponding to the network resource access request, the target device may be the HTML browsing engine 4100, and the target page may be a webpage corresponding to the webpage document data.

In one example, the network resource access request may include a type identifier for indicating a target device.

In another example, the network resource access request may include a URL, and the Step S5200 for acquiring the target file of the target device according to the received network resource access request may include: acquiring a location of the access-requested network resource according to the received URL; and acquiring the corresponding target file from the location of the network resource.

In the embodiment of the present invention, a programmable device is provided. The programmable device may include a memory and a processor. The memory may be used to store instructions, and the instructions may be used to control the processor to perform any network resource access method provided by the embodiments of the present invention.

The second embodiment of the present invention has been described above with reference to the accompanying drawings. According to the present embodiment, a hybrid apparatus 4000 and a network resource access method based on the hybrid apparatus 4000 are provided. A request is acquired according to the network resource, and a target device can be properly selected from the network resource access apparatus 2000, that is provided in the first embodiment of the present invention, and the HTML browsing engine 4100 to access the requested network resource. As such, the network resource access apparatus 200 and the HTML browsing engine 4100 can be integrated as desired. In addition, when a user interacts with a network resource that needs to be accessed through the network resource access apparatus 2000, and also with a network resource that needs to be accessed through the HTML browsing engine 4100, the user may be able to browse the interactive page, that is constituted by native UI components, together with the HTML webpage in a same window, which provides the user with continuous and desired user experience.

Those skilled in the art should understand that the network resource access apparatus 2000 and the hybrid apparatus 4000 can be implemented in various means. In one example, the network resource access apparatus 2000 and the hybrid apparatus 4000 may be implemented by an instruction configured processor. For example, the instructions may be stored in a ROM, and when the apparatus is booted, the instructions may be read into a programmable device from the ROM to implement the network resource access apparatus 2000 and the hybrid apparatus 4000. In another example, the network resource access apparatus 2000 and the hybrid apparatus 4000 can be integrated into a specified device (e.g., an ASIC). The network resource access apparatus 2000 and the hybrid apparatus 4000 may be divided into mutually independent units, or may be implemented by combining them together. The network resource access apparatus 2000 and the hybrid apparatus 4000 may be implemented by one of the various means described above, or may be implemented by a combination of two or more of the various means described above.

In addition, the network resource access method provided in accordance with the embodiment of the present invention may also be implemented as a computer program product. The computer program product may include a computer readable medium containing non-volatile program code that can be executed by a processor. The computer readable medium may store a computer program for performing the above-described functions defined in the method of the present invention. Those skilled in the art should also understand that the various illustrative logical blocks, modules, circuits, and algorithm steps described in connection with the disclosure herein may be implemented as electronic hardware, computer software, or a combination of both.

It is well known to those skilled in the art that with the development of the electronic information technology, such as the large-scale integrated circuit technology, and the trend of implementing software as hardware, it has become difficult to clearly define the boundaries between software and hardware in computer systems. Specifically, any operation that can be implemented by software may also be implemented by hardware, and any instruction that can be executed by hardware may also be completed by software.

Whether a certain machine function adopts a hardware implementation method or a software implementation method may depend on non-technical factors, such as price, speed, reliability, storage capacity, change cycle, etc. Thus, for those of ordinary skill in the art of the electronic information technology, a more straightforward and clear way for describing a technical solution is to describe each operation in the solution. When knowing the operation to be performed, those skilled in the art may be able to directly design a desired product based on the considerations of the non-technical factors.

The present invention can be a system, a method and/or a computer program product. The computer program product may include a computer readable storage medium having computer readable program instructions stored thereon for controlling a processor to implement various aspects of the present invention.

The computer readable storage medium can be a tangible device that can hold and store instructions used by an instruction execution device. For example, the computer readable storage medium may be, but is not limited to, an electrical storage device, a magnetic storage device, an optical storage device, an electromagnetic storage device, a semiconductor storage device, or any suitable combination of the above. More specific examples (non-exhaustive list) of the computer readable storage medium include: portable computer disk, hard disk, random access memory (RAM), read only memory (ROM), erasable programmable read only memory (EPROM, or flash memory), static random access memory (SRAM), portable compact disk read only memory (CD-ROM), digital versatile disk (DVD), memory stick, floppy disk, mechanical encoding device (e.g., a card with punched holes, or a structure with protrusions in grooves on which instructions are stored), and any suitable combination of the above. The computer readable storage medium used herein may not be interpreted as transient signals, such as radio waves or other electromagnetic waves that can be freely propagated, electromagnetic waves that are propagated through a waveguide or other transmission medium (e.g., light pulses transmitted through a fiber optic cable), or electrical signals transmitted through wires.

The computer readable program instructions described herein can be downloaded from a computer readable storage medium to various computing/processing devices or downloaded to an external computer or external storage device over a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device may receive computer readable program instructions from the network and forward the computer readable program instructions for storage in a computer readable storage medium in each computing/processing device.

Computer program instructions for executing the operations of the present invention may be assembly instructions, instruction set architecture (ISA) instructions, machine instructions, machine related instructions, microcode, firmware instructions, state setting data, or source code or object code that are written by a programming language or a combination of multiple programming languages. The programming languages may include object oriented programming languages such as Smalltalk, C++, etc., and conventional procedural programming languages such as C language or similar programming languages. The computer readable program instructions may be executed entirely on a user's computer, partially on a user's computer, as a stand-alone software package, partially on a user's computer and partially on a remote computer, or entirely on a remote computer or server. In a case that involves a remote computer, the remote computer can be connected to the user's computer through any kind of network, including a local area network (LAN) or a wide area network (WAN), or can be connected to an external computer (e.g., connecting through the Internet provided by an Internet service provider). In some embodiments, electronic circuits such as programmable logic circuits, field programmable gate arrays (FPGAs), or programmable logic arrays (PLAs) can be customized by utilizing the status information of computer readable program instructions, and such electronic circuits may be able to execute computer readable program instructions to implement various aspects of the present invention.

Various aspects of the present invention are described herein with reference to methods, apparatuses (systems), and flowcharts and/or block diagrams of computer program products according to the embodiments of the present invention. It should be understood that each block of the flowcharts and/or block diagrams, as well as each combination of the blocks in the flowcharts and/or block diagrams, can be implemented by computer readable program instructions.

The computer readable program instructions can be provided to a general purpose computer, a special purpose computer, or a processor of other programmable data processing apparatus to produce a machine such that when executed by a processor of a computer or other programmable data processing apparatus, an apparatus for implementing the functions/acts specified in one or more of the blocks of the flowcharts and/or block diagrams may be generated. The computer readable program instructions can also be stored in a computer readable storage medium, and the instructions can control the computer, the programmable data processing device, and/or other device to operate in a particular manner, such that the computer readable medium that stores the instructions may include a manufactured product containing instructions for implementing various aspects of the functions/acts specified in one or more of the flowcharts and/or block diagrams.

The flowcharts and block diagrams in the figures illustrate the architectures, functionalities and operations that can be possibly implemented according to the apparatuses, methods, and computer program products in various embodiments of the present invention. In this regard, each block of the flowcharts or block diagrams may represent a module, a program segment, or a portion of an instruction. The module, the program segment, or the portion of the instruction may include one or more executable instructions used to implement a specific logic function. In some alternative implementations, the functions noted in the blocks may also occur in an order different from that illustrated in the drawings. For example, two consecutive blocks may be executed substantially in parallel, and may sometimes be executed in a reverse order, depending upon the functionalities involved. It should also be noted that each block of the block diagrams and/or flowcharts, and each combination of the blocks in the block diagrams and/or flowcharts, can be implemented by a specified hardware-based system that performs a specified function or action, or can be implemented by a combination of specified hardware and computer instructions. It is well known to those skilled in the art that implementation by hardware, implementation by software, and implementation by a combination of software and hardware are equivalent.

Various embodiments of the present invention have been described above. The description above is illustrative, not exhaustive, and thus is not limited to the disclosed embodiments. Many modifications and changes should be apparent to those skilled in the art without departing from the scope of the invention. The terminology used herein was chosen to best explain the principles of the embodiments, the practical application programs, or the improvements to the technology in the market, or to enable those of ordinary skill in the art to understand the various embodiments disclosed herein. The scope of the invention is defined by the appended claims.

What is claimed is:

1. A programmable device, comprising:
a processor configured to:
provide a network resource access apparatus comprising a native application programming interface (API) unit having a feature of accessing an operating system, wherein the feature of accessing the operating system at least includes a feature of accessing native user interface (UI) components of the operating system;
parse a service function script that is written in a specified script language to obtain a content of a service function described by the service function script;
according to the content of the service function, call a native API provided by the native API unit to render and generate an interactive page constituted by a plurality of native UI components in a current window; and
according to a network resource access request:
select a target device between the network resource access apparatus and an HTML browsing engine, acquire a target file, and
call the target device to generate a target webpage corresponding to the target file and display the target webpage in the current window.

2. The device according to claim 1, wherein the processor is further configured to:
in response to an operation of a user on the interactive page, write parameters corresponding to a content of the operation to a service function script corresponding to the interactive page.

3. The device according to claim 1, wherein
the HTML browsing engine, according to received webpage document data, generates a corresponding webpage and includes a JavaScript engine for parsing the webpage document data and a typesetting engine for generating a webpage corresponding to the webpage document data,
wherein:
when the target device is the network resource access apparatus, the target file is the service function script corresponding to the network resource access request, and the target webpage is the interactive page corresponding to the service function script, and
when the target device is the HTML browsing engine, the target file is the webpage document data corresponding to the network resource access request, and the target webpage is the webpage corresponding to the webpage document data.

4. The device according to claim 3, wherein the network resource access request includes a URL, and the processor is further configured to:
according to the URL, acquire a location of network resource associated with the network resource access request; and
acquire the corresponding target file from the location of the network resource.

5. The device according to claim 3, wherein the specified script language is JavaScript, and the processor is further configured to call the JavaScript engine of the HTML browsing engine.

6. The device according to claim 3, wherein the network resource access request includes a URL, the URL carries a type identifier used to indicate an engine type of the network resource access apparatus or the HTML browser engine, and a method for the processor to select the corresponding target device from the network resource access apparatus and the HTML browsing engine according to the network resource access request includes:
identifying the type identifier carried in the URL; and
according to an identification result, selecting one from the network resource access apparatus and the HTML browsing engine as the target device.

7. The device according to claim 1, further comprising: a memory wherein the memory is configured to store instructions corresponding to the network resource access apparatus.

8. The device according to claim 1, wherein:
the feature of accessing the operating system includes one or more of a feature of accessing a sensor component of the operating system and a feature of accessing a file.

9. A network resource access method, comprising:
parsing, by a processor of a programmable device, an obtained service function script, and acquiring a content of a service function described by the service function script;
according to the content of the service function, calling, by the processor, a native API unit of a network resource access apparatus having a feature of accessing an operating system to render and generate an interactive page that corresponds to the service function script and is constituted by a plurality of native UI components in a current window, wherein the feature of accessing the operating system at least includes a feature of accessing native UI components of the operating system; and
according to a network resource access request:
selecting a target device between the network resource access apparatus and an HTML browsing engine, acquiring a target file, and
calling the target device to generate a target webpage corresponding to the target file and display the target webpage in the current window.

10. The method according to claim 9, further including:
in response to an operation of a user on the interactive page, writing, by the processor, parameters corresponding to a content of the operation to a service function script corresponding to the interactive page; and
parsing, by the processor, the service function script, and according to the content of the service function obtained through parsing, calling the native API to render and generate the interactive page in response to the operation of the user.

11. The method according to claim 9, wherein:
the HTML browsing engine, according to received webpage document data, generates a corresponding webpage; and includes a JavaScript engine for parsing the webpage document data and a typesetting engine for generating a webpage corresponding to the webpage document data,
wherein:

when the target file is the service function script corresponding to the network resource access request, the target device is the network resource access apparatus, and the target webpage is the interactive page corresponding to the service function script, and when the target file is the webpage document data corresponding to the network resource access request, the target device is the HTML browsing engine, and the target webpage is the webpage corresponding to the webpage document data.

12. The method according to claim 11, wherein:
when a specified script language of the service function script is JavaScript, the network resource access apparatus parses the service function script by calling the JavaScript engine of the HTML browsing engine.

13. The method according to claim 11, wherein the network resource access request includes a URL, the URL carries a type identifier used to indicate an engine type of the network resource access apparatus or the HTML browser engine, and a method for the processor to select the corresponding target device from the network resource access apparatus and the HTML browsing engine according to the network resource access request includes:
identifying the type identifier carried in the URL; and
according to an identification result, selecting one from the network resource access apparatus and the HTML browsing engine as the target device.

14. The method according to claim 11, wherein the network resource access request includes a URL, and acquiring the corresponding target file according to the network resource access request includes:
according to the URL, acquiring a location of network resource associated with the network resource access request; and
acquiring the corresponding target file from the location of the network resource.

15. The method according to claim 9, prior to parsing the obtained service function script and acquiring the content of the service function described by the service function script, further including:
according to a received network resource access request, acquiring a corresponding service function script that is written in a specified script language.

16. The method according to claim 9, wherein:
the feature of accessing the operating system includes one or more of a feature of accessing a sensor component of the operating system and a feature of accessing a file.

17. A non-transitory, non-volatile computer readable medium, containing processor-executable program code, wherein the processor-executable program code causes a processor of a programmable device to implement a network resource access method, the method including:
processing, by the processor, a network resource access apparatus, including:
parsing an obtained service function script, and acquiring a content of a service function described by the service function script;
according to the content of the service function, calling a native API having a feature of accessing an operating system to render and generate an interactive page that corresponds to the service function script and is constituted by a plurality of native UI components in a current window, wherein the feature of accessing the operating system at least includes a feature of accessing native UI components of the operating system; and
according to a network resource access request:
selecting a target device between the network resource access apparatus and an HTML browsing engine,
acquiring a target file, and
calling the target device to generate a target webpage corresponding to the target file and display the target webpage in the current window.

* * * * *

UNITED STATES PATENT AND TRADEMARK OFFICE
CERTIFICATE OF CORRECTION

PATENT NO. : 10,880,227 B2
APPLICATION NO. : 16/085147
DATED : December 29, 2020
INVENTOR(S) : Chen It is certified that error appears in the above-identified patent and that said Letters Patent is hereby corrected as shown below:

In the Claims

Column 24,
Lines 1 and 2, "the obtained service function script" should read --the service function script--.

Signed and Sealed this
Thirty-first Day of May, 2022

Katherine Kelly Vidal
Director of the United States Patent and Trademark Office